(12) United States Patent
Jenkinson et al.

(10) Patent No.: US 10,048,983 B2
(45) Date of Patent: Aug. 14, 2018

(54) SYSTEMS AND METHODS FOR ENLISTING SINGLE PHASE COMMIT RESOURCES IN A TWO PHASE COMMIT TRANSACTION

(71) Applicant: Red Hat, Inc., Raleigh, NC (US)

(72) Inventors: Tom Jenkinson, New Castle Upon Tyne (GB); Michael Musgrove, New Castle upon Tyne (GB); Paul Robinson, Whitley Bay (GB); Jonathan Halliday, New Castle upon Tyne (GB); Jesper Pedersen, Westford, MA (US); Mark Little, County Durham (GB)

(73) Assignee: RED HAT, INC., Raleigh, NC (US)

( * ) Notice: Subject to any disclaimer, the term of this patent is extended or adjusted under 35 U.S.C. 154(b) by 142 days.

(21) Appl. No.: 14/243,581

(22) Filed: Apr. 2, 2014

(65) Prior Publication Data
US 2015/0286496 A1 Oct. 8, 2015

(51) Int. Cl.
*G06F 9/46* (2006.01)

(52) U.S. Cl.
CPC .................................. *G06F 9/466* (2013.01)

(58) Field of Classification Search
CPC ........................... G06F 9/466; G06F 17/30289
USPC ........................................................ 718/101
See application file for complete search history.

(56) References Cited

U.S. PATENT DOCUMENTS

| | | | | |
|---|---|---|---|---|
| 5,335,343 A | * | 8/1994 | Lampson | G06F 9/466 707/999.202 |
| 6,061,708 A | * | 5/2000 | McKeehan | G06F 9/466 718/101 |
| 6,799,188 B2 | * | 9/2004 | Weedon | G06F 9/466 |
| 7,284,018 B1 | | 10/2007 | Waldorf et al. | |
| 7,791,470 B2 | | 9/2010 | Karr | |

(Continued)

FOREIGN PATENT DOCUMENTS

| | | |
|---|---|---|
| GB | 2335516 | 9/1999 |
| WO | WO/2013/138770 | 9/2013 |

OTHER PUBLICATIONS http://msdn.microsoft.com/en-us/library/ckawh9ct%28v=vs.85%29.aspx, Committing a transaction in a Single-Phase Multi-Phase.

(Continued)

*Primary Examiner* — Li B Zhen
*Assistant Examiner* — Daniel Wei
(74) *Attorney, Agent, or Firm* — Haynes and Boone, LLP

(57) ABSTRACT

Systems and methods are provided for enlisting single phase commit resources in a two phase commit transaction. An exemplary method includes accessing a global transaction having a plurality of processes requiring single phase commit (1PC) resource and a two phase commit (2PC) resource, initializing a 1PC resource manager for the 1PC resource with a first process of the plurality of processes, wherein the first process requires the 1PC resource, preparing a 2PC resource manager for the 2PC resource with a second process of the plurality of processes, wherein the second process requires the 2PC resource, generating a unique identifier for the 1PC resource, transmitting the unique identifier to the 1PC resource manager, and instructing the 1PC resource manager to commit the first process to the 1PC resource, wherein committing the first process to the 1PC resource comprises recording the unique identifier to the 1PC resource.

17 Claims, 5 Drawing Sheets

(56) References Cited

U.S. PATENT DOCUMENTS

| | | | |
|---|---|---|---|
| 8,650,272 B2* | 2/2014 | Myers | G06F 11/0709 709/223 |
| 2004/0148289 A1* | 7/2004 | Bamford | G06F 17/30377 |
| 2004/0215594 A1 | 10/2004 | Somogyi et al. | |
| 2005/0171858 A1* | 8/2005 | Cotton | G06Q 30/06 705/26.42 |
| 2012/0167098 A1* | 6/2012 | Lee | G06F 17/30377 718/101 |
| 2013/0066949 A1 | 3/2013 | Colrain et al. | |

OTHER PUBLICATIONS http://docs.oracle.com/cd/A84870_01/doc/java.816/a81354/xadistr2.htm, Oracle9i JDBC Developer's Guide and Reference.

http://f3.tiera.ru/2/Cs_Computer%20science/CsLn_Lecture%20notes/A/Advances%20in%20Databases%20and%20Information%20Systems,%208%20conf.,%20ADBIS%202004(LNCS3255,%20Springer,%202004)(ISBN%203540232435)(429s).pdf#page=288, Advances in Databases and Information Systems, András Benczúr, János Demetrovics, Georg Gottlob, Hungarian Academy of Sciences Computer and Automation Institute, Informatics Laboratory; Technische Universität Wien, Institut für Informationssysteme, Sep. 22-25, 2004.

http://hal.inria.fr/docs/00/06/39/65/PDF/paperARM05.pdf, Self-Adaptive Component-Based Transaction Commit Management, Patricia Serrano-Alvarado, Romain Rouvoy, Philippe Merle, INRIA Futurs—Jacquard Project, Theoretical Computer Science Laboratory of Lille.

http://rodos.cs.pitt.edu:8090/aps/bib/02b15eaa09fa7f63010a13e612b4005c/sac04.pdf, 1-2PC: The One-Two Phase Atomatic Commit Protocol, Yousef J. Al-Houmaily, Panos K. Chrysanthis, Dept. of Computer and Information Programs Institute of Public Administration; Department of Computer Science, University of Pittsburgh, Mar. 14-17, 2004.

http://docs.oracle.com/middleware/1212/wls/WLJTA/tr Yousef J. Al-Houmaily, Panos K. Chrysanthis xman.htm, Oracle Fusion Middleware Documentation, Nov. 2013.

* cited by examiner

SYSTEMS AND METHODS FOR ENLISTING SINGLE PHASE COMMIT RESOURCES IN A TWO PHASE COMMIT TRANSACTION

FIELD OF DISCLOSURE

The present disclosure generally relates to enlisting single phase commit and two phase commit resources in the same transaction, and more particularly to providing single phase resource managers with a unique identifier in a two phase commit transaction in order to avoid potential heuristic outcomes.

BACKGROUND

In transaction processing, a transaction manager attempts to perform processes on at least one resource. For example, a transaction may call for database updates or operations using one or more databases. A network host may provide for transaction resources utilized by a process, such as the database that requires updating and/or use. A transaction manager may receive a transaction and prepare one or more local resource managers to execute part or all of the transaction on required network hosts. Transaction processing must maintain atomicity, consistency, isolation, and durability properties (ACID properties). Atomicity requires that changes made during processing a transaction are atomic, either all the changes to a database during an operation or update occur or they all do not occur. This prevents database updates from partially occurring, which would affect the reliability and consistency of databases.

In transaction processing, a transaction may require the use of single phase commit (1PC) resources and two phase commit (2PC) resources. For example, 1PC resources may include a local resource manager that makes the decision to commit a transaction to a resource without the transaction manager. Alternatively, under 2PC, local resource managers are prepared by a transaction manager and polled to determine if the local resource managers can commit the transaction to their resources. In general, single phase commit resources cannot be combined with two-phase commit resources because failures during a voting phase may violate atomicity. Thus, single-phase resources are not processed within the scope of a 2PC transaction processing.

BRIEF SUMMARY

This disclosure relates to transaction processing systems and two-phase commit protocol transaction processing with single phase commit resources. Methods, systems, and techniques for enlisting single phase commit resources in a two phase commit transaction are provided.

According to an embodiment, a method for global transaction processing includes accessing, using a global transaction manager, a global transaction having a plurality of processes, wherein each of the plurality of processes require a single phase commit (1PC) resource and a two phase commit (2PC) resource, initializing, using one or more hardware processors associated with the global transaction manager, a 1PC resource manager for the 1PC resource and initializing, using the 1PC resource manager, a first process of the plurality of processes, wherein the first process requires the 1PC resource, and preparing a 2PC resource manager for the 2PC resource and preparing, using the 2PC resource manager, a second process of the plurality of processes, wherein the second process requires the 2PC resource. The method further includes generating a unique identifier for the 1PC resource, transmitting the unique identifier and a manager identifier for the global transaction manager to the 1PC resource manager and instructing the 1PC resource manager to commit the first process to the 1PC resource, wherein committing the first process to the 1PC resource comprises recording the unique identifier to the 1PC resource.

According to another embodiment, a system for global transaction processing includes a global transaction manager that accesses a global transaction having a plurality of processes, wherein the plurality of processes requiring a single phase commit (1PC) resource and a two phase commit (2PC) resource, and generates a unique identifier for the 1PC resource and a 1PC resource manager, coupled to the global transaction manager, that initializes a first process of the plurality of processes, receives the unique identifier and a manager identifier for the global transaction manager, and processes the unique identifier and the manager identifier with the first process, wherein the first process requires the 1PC resource. The system further includes a 2PC resource manager, coupled to the global transaction manager, that prepares a second process of the plurality of processes, wherein the second process requires the 2PC resource, wherein the global transaction manager instructs the 1PC resource manager to commit the first process to the 1PC resource, wherein committing the first process to the 1PC resource comprises recording the unique identifier the 1PC resource.

According to another embodiment, a non-transitory computer readable medium comprising a plurality of machine-readable instructions which when executed by one or more processors of a server are adapted to cause the server to perform a method including accessing, using a global transaction manager, a global transaction having a plurality of processes, wherein each of the plurality of processes require a single phase commit (1PC) resource and a two phase commit (2PC) resource, initializing a 1PC resource manager for the 1PC resource and initializing, using the 1PC resource manager, a first process of the plurality of processes, wherein the first process requires the 1PC resource, and preparing a 2PC resource manager for the 2PC resource and preparing, using the 2PC resource manager, a second process of the plurality of processes, wherein the second process requires the 2PC resource. The method further includes generating a unique identifier for the 1PC resource, transmitting the unique identifier and a manager identifier for the global transaction manager to the 1PC resource manager, and instructing the 1PC resource manager to commit the first process to the 1PC resource, wherein committing the first process to the 1PC resource comprises recording the unique identifier to the 1PC resource.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
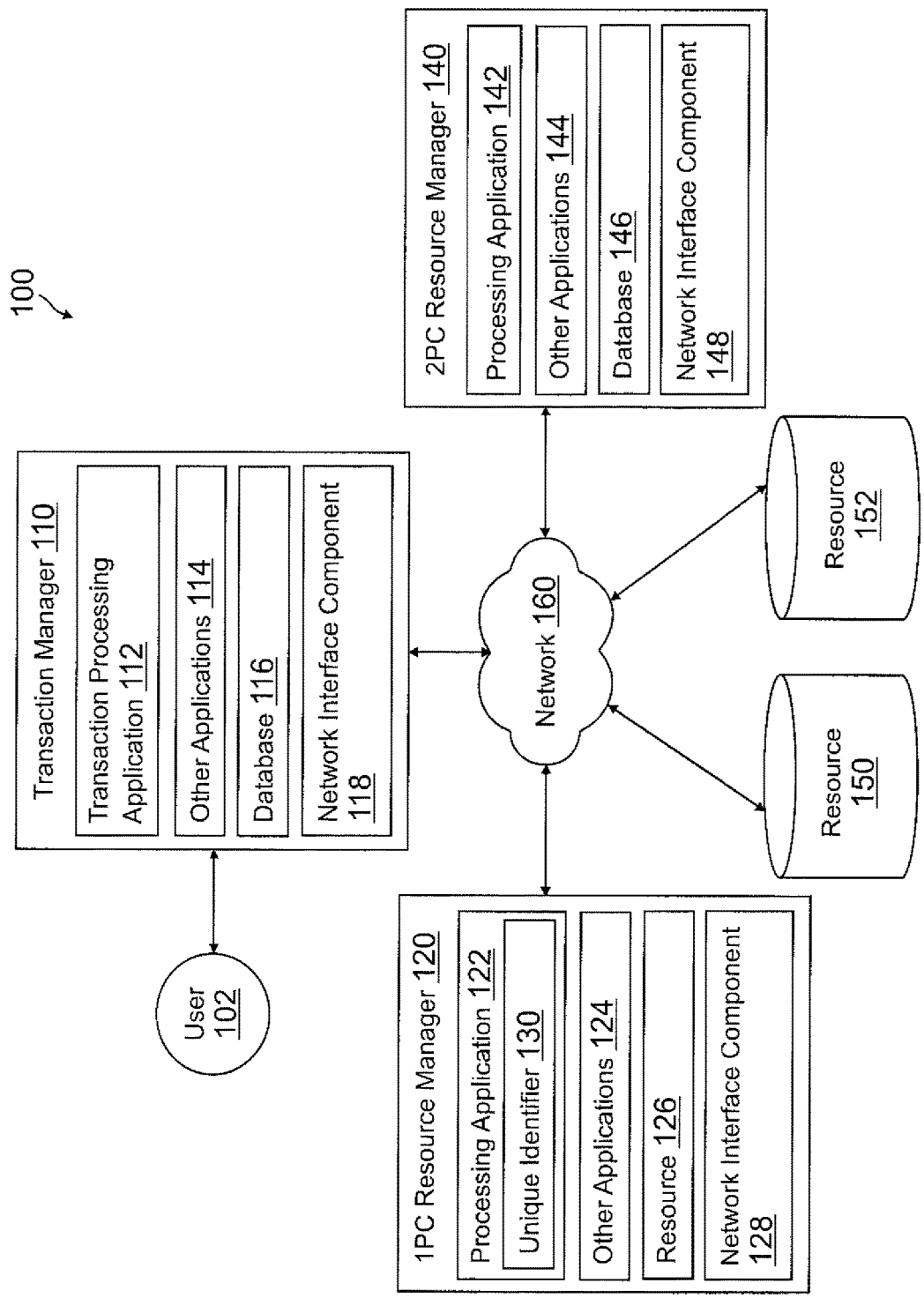
FIG. 1 is a simplified block diagram of an exemplary system for enlisting single phase commit resources in a two phase commit transaction, according to an embodiment.

FIG. 1 is a simplified block diagram of an exemplary system for enlisting single phase commit resources in a two phase commit transaction, according to an embodiment. Terms like "machine," "device," "computer," and "computing system" are used interchangeably and synonymously throughout this document. System 100 may include a server computing system or a client computing system.

FIG. 1 is a block diagram of a networked system 100 suitable for implementing the processes described herein according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, an APPLE® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client 102, a transaction manager 110, a single phase commit (1PC) resource manager 120, a two phase commit (2PC) resource manager 140, a resource 150, and a resource 152 in communication over a network 160. Client 102, transaction manager 110, 1PC resource manager 120, 2PC resource manager 140, resource 150, and resource 152 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

In FIG. 1, client 102 may submit a transaction for processing to transaction manager 110, such as a transaction having processes requiring the use of resources 150 and 152. Resource 150 may correspond to a 1PC resource while resource 152 may correspond to a 2PC resource. Transaction manager 110 may establish 1PC resource manager 120 to process the transaction on resource 150. Similarly, transaction manager 110 may establish 2PC resource manager 140 to process the transaction on resource 152. Client 102 may be implemented using any appropriate hardware and software configured for wired and/or wireless communication with transaction manager 110. For example, in one embodiment, client 102 may be implemented as a personal computer (PC), a smart phone, personal digital assistant (PDA), laptop computer, tablet computer and/or other types of computing devices capable of transmitting and/or receiving data. Although a client is shown, the client may be managed or controlled by any suitable processing device. Although only one client is shown, a plurality of clients may be utilized.

Transaction manager 110 may be implemented using any appropriate hardware and software configured for wired and/or wireless communication with 1PC resource manager 120, 2PC resource manager 140, resource 150, and resource 152 over network 160. For example, in one embodiment, transaction manager 110 may be implemented as a personal computer (PC), a smart phone, personal digital assistant (PDA), laptop computer, tablet computer and/or other types of computing devices capable of transmitting and/or receiving data. Although a transaction manager is shown, the transaction manager may be managed or controlled by any suitable processing device.

Transaction manager 110 may utilize one or more applications to process a transaction requiring the use of 1PC resource 150 and 2PC resource 152, where the applications may utilize a 1PC optimization and a 2PC protocol to process the transaction. In this regard, transaction manager 110 contains a transaction processing application 112, other applications 114, a database 116, and a network interface component 118. Transaction processing application 112 and other applications 114 may correspond to processes, procedures, and/or applications executable by a hardware processor, for example, a software program. In other embodiments, transaction manager 110 may include additional or different software as required.

Transaction processing application 112 may be implemented as an application configured to provide transaction processing to client 102. Client 102 may transmit a transaction to transaction manager 110 for processing. Transaction processing application 112 may receive and process the transaction by determining the processes of the transaction and establishing participating network nodes to execute the processes of the distributed transaction. A process of a transaction may correspond to a workload for execution by 1PC resource manager 120 or 2PC resource manager 140. In this regard, transaction processing application 112 may establish 1PC resource manager 120, which may perform a process on 1PC resource 150, such as an atomic update/operation to a 1PC resource. Transaction processing application 112 may transmit the business logic and initialize a local transaction with 1PC resource manager 120. Additionally, transaction processing application 112 may establish 2PC resource manager 140, which may perform a process on 2PC resource 152. 1PC resource manager 120 and 2PC resource manager 140 may be enlisted in any order. Additionally, 2PC resource manager 140 may be enlisted and prepared at any point prior to writing a unique identifier 130 and 1PC resource manager 120 to a transaction log, as will be explained in more detail herein. 2PC resource manager 140, after receiving a prepare request for a process by transaction processing application 112, may execute the local process/transaction up until 2PC resource manager 140 is ready to commit the local process/transaction to the 2PC resource, resource 152. A local process/transaction may correspond to a database update/use that changes (e.g., adds, alters, or deletes) data stored on the database. 1PC resource managers 120 and 2PC resource managers 140 may each operate on one or more resources 150 and 152.

As the transaction received from client 102 requires the use of a 1PC resource, resource 150, and a 2PC resource, resource 152, transaction processing application 112 may establish a main coordinator on transaction manager 110 to complete the transaction. Thus, transaction manager 110 may govern the steps of the transaction processing. In order to process the transaction on the 1P resource 150 after establishing 1PC resource manager 120, transaction processing application 112 may generate a unique identifier for 1PC resource manager 120. Transaction processing application 112 may transmit the unique identifier, unique identifier 130, with a manager identifier for transaction manager 110 to 1PC resource manager 120. Transaction processing application 112 may instruct 1PC resource manager to record unique identifier 130 (and, in various embodiments, the manager identifier) to stable storage within the scope of the local process/transaction for 1PC resource manager 120.

For example, the identifier(s) may be recorded to a table, such as an XID table, of a 1PC resource, that is resource 150, during commitment of the local process/transaction to resource 150 by the 1PC resource manager 120. In other embodiments, unique identifier 130 (and, in various embodiments, the manager identifier) may be written to the same document, table, and/or message within the scope of the atomic update/operation. The 1PC resource, resource 150, may support Java Database Connectivity (JDBC) local transactions. Additional 1PC resources may include a Java Message Service (JMS) resource or a NoSQL database.

Transaction processing application 112 may retain a transaction log having the transaction participants (1PC resource manager 120 and 2PC resource manager 140), an initial state of each of the transaction participants (e.g., a rollback state), and/or processes taken by each of the transaction participants. The transaction log may be utilized for rollback to an initial state in the event of system failure, failure of a participant, and/or failure of the coordinator. After transmitting the unique identifier and the manager identifier to 1PC resource manager 120, transaction processing application 112 may write a record to the transaction log having information identifying 1PC resource manager 120 and the unique identifier provided to 1PC resource manager 120. As previously discussed, transaction processing application 112 may enlist and prepare 2PC resource manager 140 at any time prior to performing this transaction log write for 1PC resource manager 120 and unique identifier 130. However, the information for 1PC resource manager 120 and unique identifier 130 should be written to the transaction log prior to asking 2PC resource manager 140 to commit a local process/transaction.

Transaction processing application 112 may determine 1PC resource manager 120 has completed the atomic transaction that 1PC resource manager 120 was initialized to complete. For example, transaction processing application 112 may receive a committed notification from 1PC resource manager 120 if 1PC resource manager 120 is able to commit the local process/transaction to the 1PC resource, resource 150. If 1PC resource manager 120 is unable to commit the local process/transaction to resource 150, transaction processing application 112 may attempt to have 1PC resource manager 120 process the local process/transaction again, wait for 1PC resource manager 120 to recover, or utilize a failure management component that may handle system failures. In such events, transaction processing application 112 may wait for confirmation that 1PC resource manager 120 has committed the local process/transaction before proceeding.

Once 1PC resource manager 120 (and, in various embodiments, other 1PC resource managers) has completed the local process/transaction, transaction processing application 112 may utilize a two-phase commit (2PC) protocol to determine whether each of the established transaction participants (e.g., 2PC resource manager 140) is ready to execute and commit the respective process on the resource of the transaction participant. 2PC requires the main transaction coordinator on transaction manager 110 to poll the participating nodes to determine whether the processes can commit, or are in a state where the processes have executed correctly and may make the changes to the database (called a voting phase). If every participating node responds that their respective process can commit, then the main coordinator instructs the nodes to commit the process (called a commit phase). If any participating node responds that the node cannot commit, then the distributed transaction is rolled back so that no changes take place.

Thus, if all of 1PC resource manager 120 has committed and 2PC resource manager 140 is ready to commit, transaction processing application 112 may instruct 2PC resource manager 140 to commit the local process/transaction. However, if 1PC resource manager 120 has not yet committed (or has failed) or 2PC resource manager 140 has failed, transaction processing application 112 may roll back the transaction so that any changes on the 2PC resource, resource 152, are reverted to an original state.

If 1PC resource manager 120 commits the local process/transaction on resource 150, and 2PC resource manager 140 commits the local process/transaction on resource 152, then transaction processing application 112 may delete the information on 1PC resource manager 120 and the unique identifier for 1PC resource manager 120 from the transaction log. Additionally, transaction processing application 112 may instruct 1PC resource manager 120 to delete the unique identifier (and, in various embodiments, the manager identifier) from resource 150.

In various embodiments, system failures may cause transaction processing application 112 to begin recovery of the transaction from client 102 to complete execution and ensure atomicity is not violated. If 1PC resource manager 120 committed the local process/transaction, the unique identifier may still be found in resource 150. The transaction log may include information of 1PC resource manager 120 for resource 150 and the unique identifier sent to 1PC resource manager 120. Thus, transaction processing application 112 may establish a recovery manager that may recover 2PC resource manager 140. The recovery manager may retrieve the unique identifier in resource 150 from 1PC resource manager 120. Additionally, the recovery manager may read the transaction log to determine which unique identifier should be found with 1PC resource manager 120. If the unique identifier sent to 1PC resource manager 120 noted in the transaction log cannot be found in resource 150, a failure occurred during processing and committing the local process/transaction of 1PC resource manager 120. Transaction processing application 112 may then rollback 2PC resource manager 140. However, if the unique identifier is retrieved from resource 150, then transaction processing application 112 knows that 1PC resource manager 120 committed it's local process/transaction and 2PC resource manager 140 can be committed if 2PC resource manager 140 is prepared.

Transaction manager 110 includes other applications 114 as may be desired in particular embodiments to provide features to transaction manager 110. For example, other applications 114 may include security applications for implementing security features, programmatic client applications for interfacing with appropriate application programming interfaces (APIs) over network 160, or other types of applications. Other applications 114 may contain software programs, executable by a processor, including a graphical user interface (GUI) configured to provide an interface to a client/user/system administrator.

Transaction manager 110 may further include database 116 which may include, for example, 1PC optimization and 2PC protocol information, network information for 1PC resource manager 120 and 2PC resource manager 140 including identifiers, corresponding resources, and/or processing information. Database 116 may include a transaction from client 102 for processing by transaction manager 110. Database 116 may include information on 1PC resource manager 120 and 2PC resource manager 140 including a commit state of the corresponding established transaction participant. Information in database 116 may correspond to manager identifier(s) for transaction manager 110 and/or unique identifier(s) for 1PC resource manager 120. Database 116 may further store transaction log information.

In various embodiments, transaction manager 110 includes at least one network interface component 118 adapted to communicate with 1PC resource manager 120, 2PC resource manager 140, resource 150, and/or resource 152 over network 160. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

1PC resource manager 120 may be implemented using any appropriate hardware and software configured for wired and/or wireless communication with transaction manager 110, 2PC resource manager 140, resource 150, and/or resource 152 over network 160. For example, in one embodiment, 1PC resource manager 120 may be implemented as a personal computer (PC), a smart phone, personal digital assistant (PDA), laptop computer, tablet computer and/or other types of computing devices capable of transmitting and/or receiving data. Although a 1PC resource manager is shown, the 1PC resource manager may be managed or controlled by any suitable processing device. Although only one 1PC resource manager is shown, a plurality of 1PC resource managers may be utilized. 1PC resource manager may be a Java Database Connectivity (JDBC) resource manager that supports JDBC local transactions.

1PC resource manager 120 may utilize one or more applications to process a local transaction having at least one process of a global transaction using a two-phase commit protocol application (2PC). In this regard, 1PC resource manager 120 contains a processing application 122 having a unique identifier 130, other applications 124, a resource 126, and a network interface component 128. Processing application 122 and other applications 124 may correspond to processes, procedures, and/or applications executable by a hardware processor, for example, a software program. In other embodiments, 1PC resource manager 120 may include additional or different software as required.

Processing application 122 may be configured to provide processing of received local processes/transactions from a main coordinator established by transaction manager 110. Thus, processing application 122 may perform an atomic update/operation to a 1PC resource, resource 150. In this regard, processing application 122 may receive a local process/transaction from transaction manager 110. Using 1PC optimization, processing application 122 may execute the process on a 1PC resource, resource 150. When utilizing 1PC optimization, processing application 122 may receive the local process/transaction and execute the process/transaction on resource 150 without receiving a commit command from transaction manager 110. Processing application 122 makes a decision as to the commitment status of the process based on whether 1PC resource manager 110 can commit the process. Thus, if 1PC resource manager 110 is ready to commit the process to resource 150, processing application 122 will commit the process to resource 150.

Processing application 122 also receives unique identifier 130 from transaction processing application 112 of transaction manager 110. Unique identifier 130 may correspond to a unique token, number, hash, etc. for 1PC resource manager 120. 1PC resource manager 120 may be instructed to store unique identifier 130 to stable storage during processing of the local process/transaction. Thus, when processing application 112 processes the local process/transaction, processing application 112 may record unique identifier 130 to stable storage with resource 150. In other embodiments, unique identifier 130 (and, in various embodiments, the manager identifier) may be written to another document, table, and/or message that is recorded within the scope of the atomic update/operation. Later, unique identifier may be retrieved for confirmation that processing application 122 executed and committed the local process/resource and did not fail.

If processing application 122 commits the local process/transaction, processing application 122 may inform transaction manager 110 that it was successful. However, if 1PC resource manager 120 fails for some reason, transaction manager 110 may have processing application 122 attempt the above described process again for the local process/transaction when 1PC resource manager 120 recovers.

In various embodiments, 1PC resource manager 120 includes other applications 124 as may be desired in particular embodiments to provide features for 1PC resource manager 120. For example, other applications 124 may include security applications for implementing security features, programmatic server applications for interfacing with appropriate application programming interfaces (APIs) over network 160, or other types of applications. Other applications 124 may contain software programs, such as a graphical user interface (GUI), executable by a processor that is configured to provide an interface to the user.

1PC resource manager 120 includes database 126, which may be configured to store 1PC optimization information, network node information for transaction manager 110 and/or 2PC resource manager 140 including identifiers, corresponding resources, and/or processing information. Database 126 may include a local process/transaction designated for processing by 1PC resource manager 120. Database. 126 may include unique identifier 130 and/or a manager identifier for transaction manager 110. Database 126 may include participant log information of information for use in committing the local process/transaction.

In various embodiments, 1PC resource manager 120 includes at least one network interface component 128 adapted to communicate with transaction manager 110, 2PC resource manager 140, resource 150, and/or resource 152 over network 160. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices 2PC resource manager 140 may be implemented using any appropriate hardware and software configured for wired and/or wireless communication with transaction manager 110, 1PC resource manager 120, resource 150, and/or resource 152 over network 160. For example, in one embodiment, 2PC resource manager 140 may be implemented as a personal computer (PC), a smart phone, personal digital assistant (PDA), laptop computer, tablet computer and/or other types of computing devices capable of transmitting and/or receiving data. Although a transaction manager is shown, the transaction manager may be managed or controlled by any suitable processing device. Although only one transaction manager is shown, a plurality of transaction managers may be utilized.

2PC resource manager 140 may utilize one or more applications to process a received prepare request having at least one process of a transaction using 2PC protocol. In this regard, 2PC resource manager 140 contains a processing application 142, other applications 144, a database 146, and a network interface component 148. Processing application 142 and other applications 144 may correspond to processes, procedures, and/or applications executable by a hardware processor, for example, a software program. In other embodiments, 2PC resource manager 140 may include additional or different software as required.

Processing application 142 may be configured to provide processing of received prepare requests from a main coordinator established by transaction manager 110. In this regard, processing application 142 may receive a prepare request from transaction manager 110. The prepare request may include a process to execute by 2PC resource manager 140. Using a 2PC protocol, processing application 142 may execute the process up until 1PC resource manager 120 is ready to commit the changes to one or more resources (e.g., resource 130). Once 2PC resource manager 140 reaches a "ready to commit" state, 2PC resource manager 140 may respond to a query by transaction manager 110 with information that 2PC resource manager 140 is ready to commit the process to the resource. While executing the process up to a ready to commit state, processing application 142 may retain a participant log having data corresponding to the coordinator, an initial state of the 2PC resource, resource 152, and processes taken by 2PC resource manager 140. 2PC resource manager 140 may wait until the coordinator executing on transaction manager 110 notifies 2PC resource manager 140 to commit before executing the process on the resource (e.g., permanently changing the resource to survive failures and meet the durability requirement of transaction processing). If 1PC resource manager 120 fails, the coordinator fails, or another issue arises, the participant log can be used to "rollback" or revert to the initial state. If 1PC resource manager 120 commits a local process/transaction of 1PC resource 120, transaction manager 110 may instruct 2PC resource manager 140 to commit. Additionally, during recovery, 2PC resource manager 140 may commit or roll-back based on whether unique identifier 130 for 1PC resource manager 120 from a transaction log entry is in resource 150, as previously discussed In various embodiments, 2PC resource manager 140 includes other applications 144 as may be desired in particular embodiments to provide features for 2PC resource manager 140. For example, other applications 144 may include security applications for implementing security features, programmatic server applications for interfacing with appropriate application programming interfaces (APIs) over network 160, or other types of applications. Other applications 144 may contain software programs, such as a graphical user interface (GUI), executable by a processor that is configured to provide an interface to the user.

2PC resource manager 140 includes database 146, which may be configured to store 2PC protocol information, network node information including identifiers, corresponding resources, and/or processing information. Database 146 may include a local process/transaction designated for processing by 2PC resource manager 140. Database 146 may include participant log information for committing or rolling back the local process/transaction including an initial state of a resource used by 2PC resource manager 140, completed processes by 2PC resource manager 140 or other information necessary for rollback and roll-forward states.

In various embodiments, 2PC resource manager 140 includes at least one network interface component 148 adapted to communicate with transaction manager 110, 1PC resource manager 120, resource 150, and/or resource 152 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Resources 150 and 152 may correspond to a resource accessible and utilized by transaction manager 110, 1PC resource manager 120, and 2PC resource manager 140 during processing of a transaction. Resources 150 and 152 may correspond to a database having data organized and/or stored in data structures that may be searched, altered, and stored. Resource 150 may correspond to a 1PC resource utilized by 1PC resource manager 120 during transaction processing while resource 152 may correspond to a 2PC resource utilized by 2PC resource manager 140 during transaction processing. Resource 150 may support Java Database Connectivity (JDBC) local transactions. In various embodiments, resource 150 as a 1PC resource may be a non-XA resource while resource 152 as a 2PC resource may be an XA resource. It is understood that resources 150 and 152 are exemplary and various embodiments may include a different number of resources as desired. Although resources 150 and 152 is shown separate and accessible over network 160 to 1PC resource manager 120 and 2PC resource manager 140, in various embodiments, resources 150 and 152 may be local or contained within 1PC resource manager 120 and 2PC resource manager 140, respectively.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, for example the various components of system 100 of FIG. 1.

Figure 2:
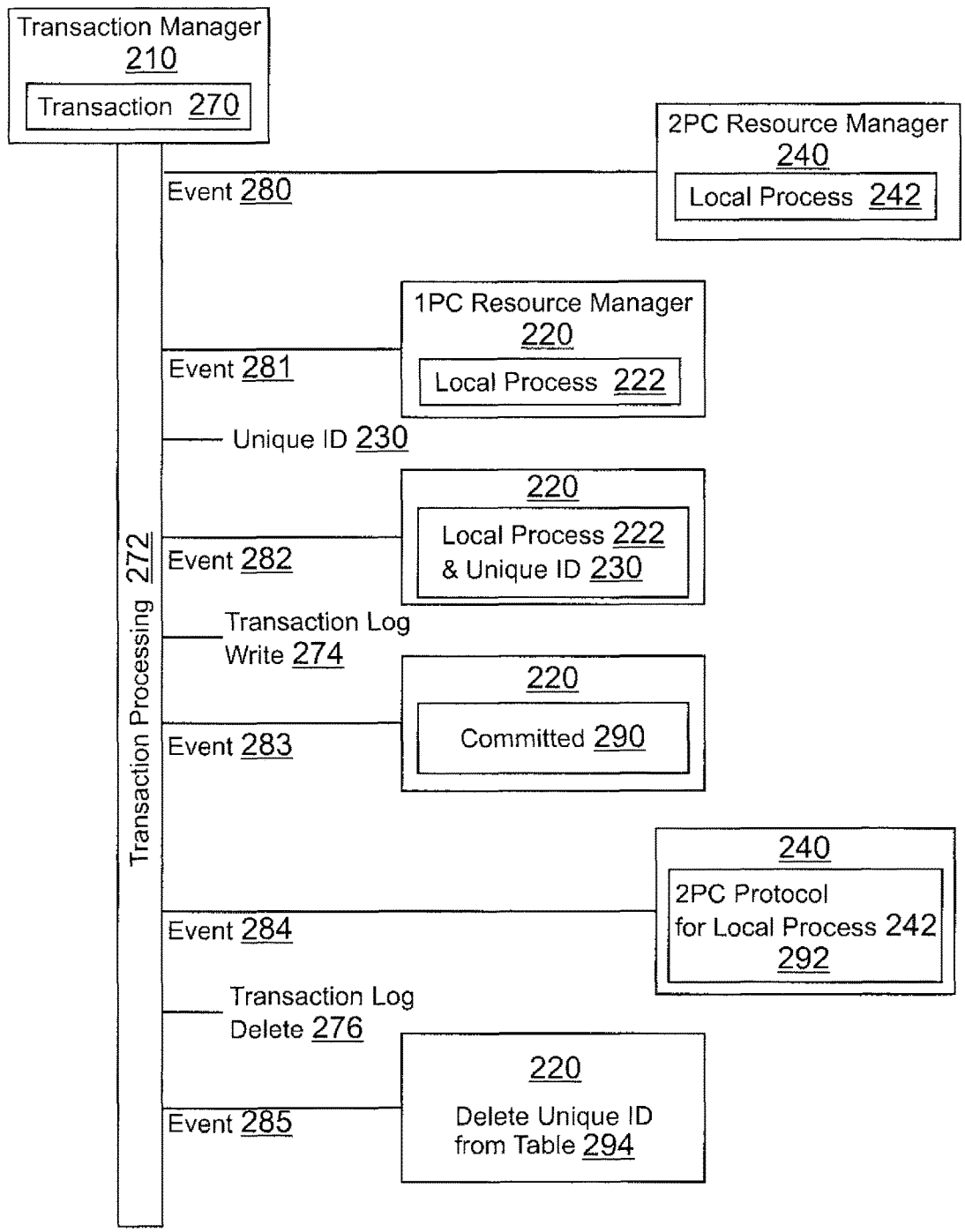
FIG. 2 is a simplified block diagram illustrating an execution tree for committing single phase commit resources in a two phase commit transaction, according to an embodiment.

FIG. 2 is a simplified block diagram illustrating an execution tree for committing single phase commit resources in a two phase commit transaction, according to an embodiment. FIG. 2 includes a transaction manager 210, a 1PC resource manager 220 and a 2PC resource manager 240 corresponding generally to transaction manager 110, 1PC resource manager 120, and 2PC resource manager 240, respectively, of FIG. 1.

In FIG. 2, transaction manager 210 processes a transaction 270 that requires the use of at least one 1PC resource and 2PC resource. A transaction may include processes, such as workloads for execution by 1PC resource manager 220 or 2PC resource manager 240. Thus, local process 222 and local process 242 may correspond to workloads for execution by 1PC resource manager 220 and 2PC resource manager 240, respectively. Transaction manager 210 executes transaction processing 272 that has events corresponding to processing transaction 270. Thus, in order to process a 1PC resource within the scope of a 2PC transaction, transaction manager executes event 280 to establish and enlist 2PC resource manager 240 having local process 242. 2PC resource manager 240 similarly may correspond to a local resource manager of a 2PC resource. Although event 280 is shown as occurring before events 281 and 282, event 280 may occur at any time before a transaction log write 274. Thus, in various embodiments, event 280 may occur after event 281, generation of a unique identifier 230, or event 282, but prior to transaction log write 274.

Transaction manager 210 may next execute event 281 that initializes 1PC resource manager 220 having local process 222. Local process 222 may correspond to some workload, such as an atomic operation to a 1PC resource. Transaction manager 210 may utilize 1PC resource manager 220 to process local process 222 on the 1PC resource. Thus, transaction manager 210 may initialize 1PC resource manager 220 and local process 222 for execution by 1PC resource manager 220.

After enlisting/initializing 1PC resource manager 220, transaction manager 210 generates unique identifier 230 for 1PC resource 220. Unique identifier 230 may correspond to some identifier, value, token, etc. that corresponds to 1PC resource manager 220 and uniquely identifies 1PC resource manager 220 and/or local process 222. Unique identifier 230 corresponds only to 1PC resource manager 220 and is not used to identify another local resource manager of a 1PC resource. Where a plurality of 1PC resource managers are enlisted during transaction processing 272, a plurality of unique identifiers 230 may be utilized to identify each 1PC resource manager uniquely.

After generating unique identifier 230, transaction manager 210 transmits unique identifier 230 to 1PC resource manager 220 at event 282. Transaction manager 210 may request for 1PC resource manager 220 to record unique identifier 230 to the 1PC resource during processing of local process 222. 1PC resource manager may therefore have local process 220 and unique identifier 230. For example, unique identifier 230 may be inserted into the table of the 1PC resource while processing and committing local process 222 so that that unique identifier 230 is only present in the 1PC resource if 1PC resource manager 220 can commit local process 222 to the 1PC resource. The table may be labeled a XID table in within the scope of local process 222 with the 1PC resource. In various embodiments, transaction manager 210 may also transmit a manager identifier for transaction manager 210 to 1PC resource manager 220. In such embodiments, 1PC resource manager 220 may also record the manager identifier to the 1PC resource. In other embodiments, where 1PC resource manager 220 does not support local transactions and an atomic operation is executed, unique identifier 230 (and, in various embodiments, the manager identifier) may be written to a document, table, and/or message within the scope of the scope of the atomic operation.

After transmitting unique identifier 230 to 1PC resource manager 220, transaction manager may execute a transaction log write 274 during transaction processing 272. Transaction log write 274 may correspond to a record in a transaction log for transaction 270 that includes information detailing 1PC resource manager 220 and unique identifier 230 provided to 1PC resource manager 220. Additionally, other information may be written to the transaction log, such as information identifying 2PC resource manager 240 (e.g., identifiers and/or branches for 2PC resource manager 240), commit status of 2PC resource manager 240, or other necessary information for processing of transaction 270 using 2PC resource manager 240 (e.g., for committing or rolling back 2PC resource manager 240).

After enlisting/initializing 1PC resource manager 210, providing unique identifier 230 to 1PC resource manager 210, and executing transaction log write 274, 1PC resource manager 220 commits local process 222 or otherwise completes the atomic update/operation to a 1PC resource. Since 1PC resource manager 220 executes a 1PC protocol/optimization on a 1PC resource, transaction manager 210 cedes authority to commit or rollback local process 222 on the 1PC resource to 1PC resource manager 220. Thus, transaction manager 210 does not poll 1PC resource manager 220 to determine if 1PC resource manager 220 can commit the process and then instruct 1PC resource manager 220 to commit or rollback local process 220. Instead, during event 283, 1PC resource manager either commits local process 222 or fails. Thus, the atomic update/operation of local process 222 is completed by 1PC resource manager 210. Transaction manager 210 listens to determine if 1PC resource manager has completed local process 222.

If there is a system failure, 1PC resource manager may have either committed local process 222 or failed. Using transaction log write 274 and unique identifier 230, transaction manager 210 may determine whether to commit or rollback 2PC resource manager 240, as will be explained in more detail with respect to FIG. 3. However, if there are not any failures and 1PC resource manager 210 commits local process 222, then transaction manager 210 may execute event 284 to commit local process 242 of 2PC resource manager 240. Transaction log write 274 should occur before event 284 in order to safeguard the processing of transaction 270 in the event of system failures. Since 2PC resource manager 240 utilizes 2PC protocol to commit 292, transaction manager 210 may poll (e.g., during a voting phase) 2PC resource manager 240 to determine if 2PC resource manager 240 is ready to commit local process 242. If 2PC resource manager 240 is ready to commit local process 242, transaction manager 210 instructs 2PC resource manager 240 to commit local process 242 during event 284. However, if rollback is required for 2PC resource manager 240, then transaction manager 210 may rollback 2PC resource manager 240 and again attempt to prepare and commit local process 242 on the 2PC resource.

After 2PC resource manager 240 commits local process 242, transaction manager 210 executes a transaction log delete 276 corresponding to deletion of the transaction log record from transaction log write 274. Transaction log delete 276 may remove the unique identifier and information of 1PC resource manager 220 from the transaction log. In various embodiments, additional information may be deleted from the transaction log during transaction log delete 276, such as 2PC resource manager 240 information (e.g., identifiers and branches), or the entire transaction log may be deleted. Additionally, transaction manager 210 requests to delete unique identifier 230 from the 1PC resource 294 at event 285.

Figure 3:
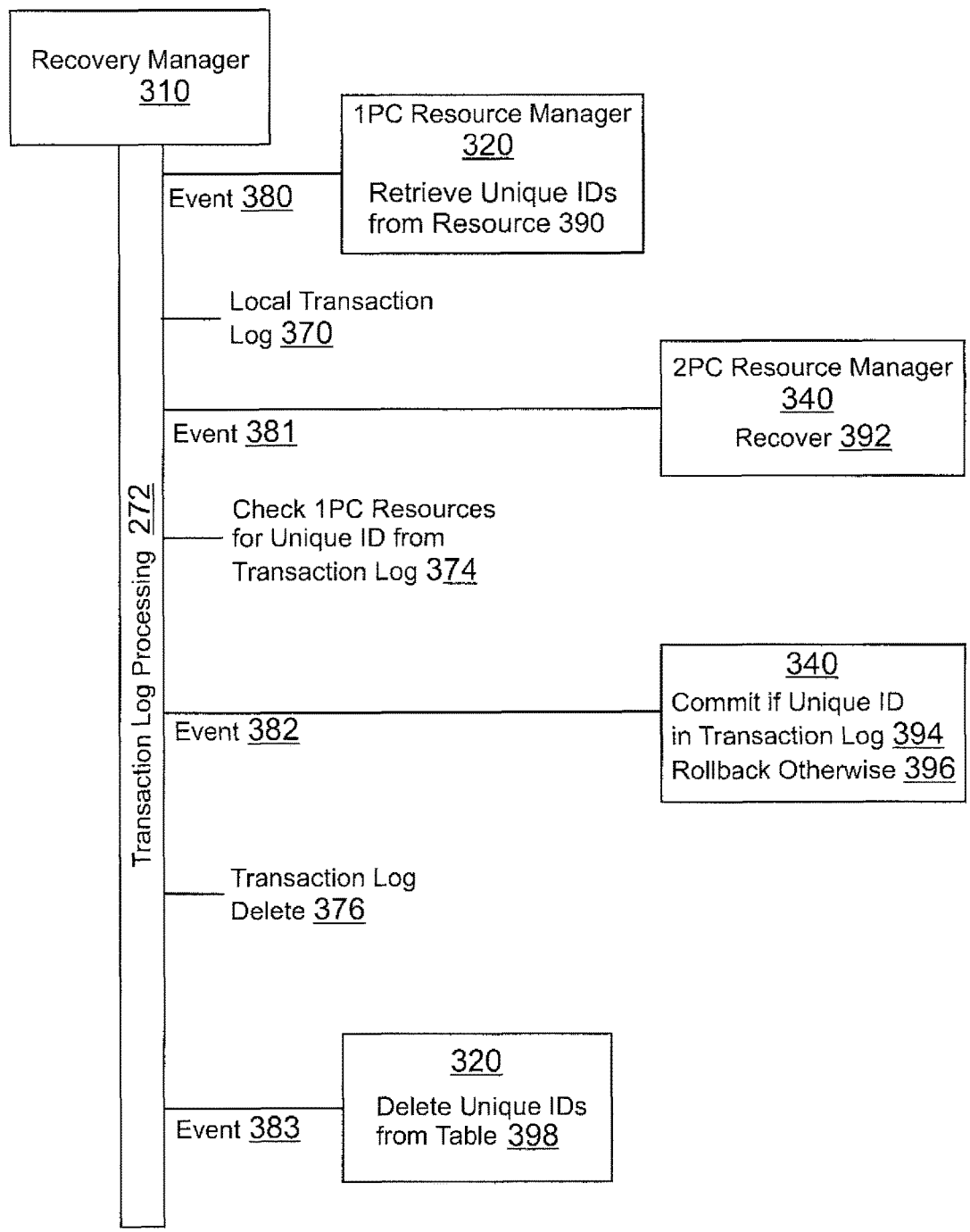
FIG. 3 is a simplified block diagram of a recovery manager for a two phase commit transaction having single phase commit resources, according to an embodiment.

FIG. 3 is a simplified block diagram of a recovery manager for a two phase commit transaction having single phase commit resources, according to an embodiment. FIG. 3 includes a recovery manager 310 that may execute on a transaction manager, such as transaction manager 110 and/or 210 of FIG. 1 and/or FIG. 2, respectively. Additionally, FIG. 3 includes a 1PC resource manager 320 and a 2PC resource manager 340 corresponding generally to 1PC resource manager 120 and 2PC resource manager 140, respectively, of FIG. 1.

FIG. 3 shows an exemplary process for recovering from a system failure during processing a transaction. Thus, as shown in FIG. 3, recover manager 310 is executes transaction log processing 272 that attempts to recover and complete a transaction processing using a transaction log. In order to complete transaction log processing 272 and recover from the failure, recovery manager 310 executes event 380 that receives the unique identifier(s) stored in the 1PC resource(s) from 1PC resource manager 320. For example, as discussed in FIG. 2, a unique identifier is transmitted to 1PC resource manager 320. If 1PC resource manager 320 initializes and commits its local process/transaction, the unique identifier may be stored to the 1PC resource during the commitment of the local process/transaction. Recovery manager 310 can read the unique identifiers from the 1PC resource using 1PC resource manager 320. In other embodiments, where 1PC resource manager 320 does not support local transactions and an atomic operation is executed, unique identifiers (and, in various embodiments, the manager identifier) may be written to a document, table, and/or message within the scope of the atomic operation/update on the 1PC resource. Thus, recovery manager 310 may receive the unique identifiers from another data source within 1PC resource manager 320.

After retrieving the unique identifiers, recovery manager 310 reads the transaction log 370. Recovery manager 310 may utilize the transaction log to recover 2PC resource manager 340. During event 381, 2PC resource manager 340 recovers 392. When recovering 2PC resource manager 340, recovery manager 310 may determine if 2PC resource manager 340 is ready to commit a local process/transaction. If 2PC resource manager 340 is ready to commit the local process/transaction, recovery manager 310 needs to determine whether to commit based on a commitment of all of the processes for the 1PC resources by 1PC resource manager 320.

As previously discussed, information of 1PC transaction manager 320 and the unique identifier assigned and transmitted to 1PC transaction manager is written to the transaction log. Thus, 1PC resources are checked for their unique identifier from the transaction log 374. Using the information in the transaction log, recovery manager 310 can determine whether the local process/transaction of 1PC resource manager 320 has committed. For example, if a unique identifier for 1PC transaction manager 320 in the transaction log is not found/retrieved from the 1PC resource during event 380, than 1PC resource manager 320 never committed the local process/transaction. However, if all the unique identifiers retrieved during event 380 are found in the transaction log, than 1PC resource manager 320 (and, in various embodiments, the other 1PC resource managers) have all committed their local process/transaction. Thus, recovery manager 310 may determine if 1PC resources have committed.

If all of the unique identifiers retrieved are listed in the transaction log, then recovery manager 310 can execute event 382. During event 382, 2PC transaction manager 340 either commits if the unique identifiers in the transaction log 394 are found with the 1PC resource of 1PC resource manager 320. Otherwise 2PC resource manager 340 is rolled-back 396. After committing or rolling back 2PC resource manager 340, recovery manager 310 performs a transaction log delete 376 to remove the information of 1PC resource manager 320 and the unique identifiers. Additionally, recovery manager 310 instructs 1PC resource manager 320 to delete the unique identifiers 398 from the 1PC resource at event 383.

Figure 4:
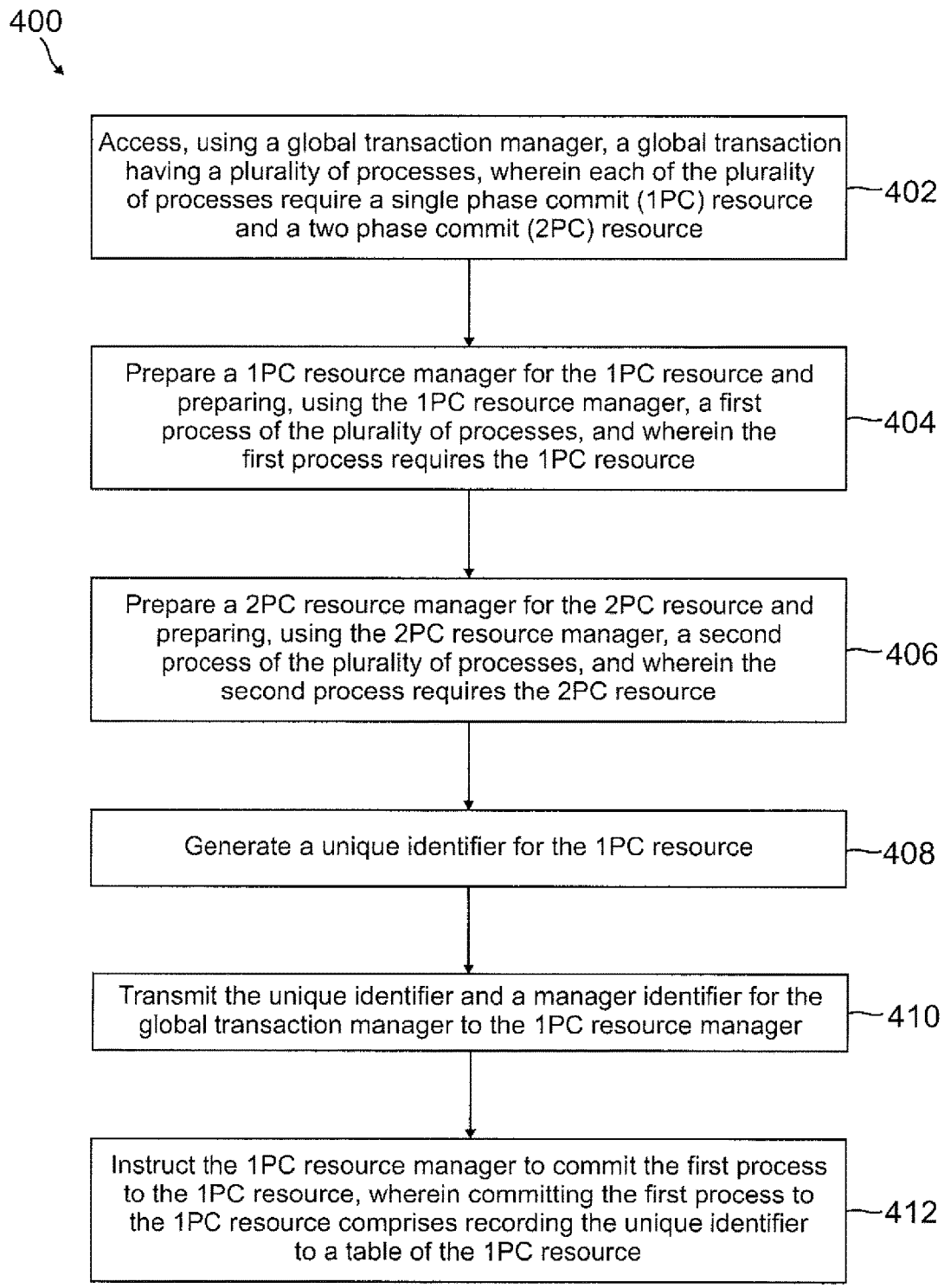
FIG. 4 is an exemplary flowchart illustrating a method of enlisting single phase commit resources in a two phase commit transaction, according to an embodiment.

FIG. 4 is an exemplary flowchart illustrating a method of enlisting single phase commit resources in a two phase commit transaction, according to an embodiment. Note that one or more steps, processes, and methods described herein may be omitted, performed in a different sequence, or combined as desired or appropriate.

At step 402, a global transaction having a plurality of processes is accessed using a global transaction manager, where each of the plurality of processes require a single phase commit (1PC) resource an a two phase commit (2PC) resource. At step 404, a 1PC resource manager for the 1PC resource is initialized and a first process of the plurality of processes is initialized using the 1PC resource manager, where the first process requires the 1PC resource. Additionally, at step 406, a 2PC resource manager for the 2PC resource is prepared and a second process of the plurality of processes is prepared using the 2PC resource manager, where the second process requires the 2PC resource. The 1PC resource may comprise a non-XA resource, and the 2PC resource may comprise an XA resource. The 1PC resource may support Java Database Connectivity (JDBC) local transactions, and the 1PC resource manager may comprise a JDBC transaction manager.

At step 408, a unique identifier for the 1PC resource is generated. The unique identifier is transmitted with a manager identifier for the global transaction manager to the 1PC resource manager, at step 410. Additionally, the 1PC resource manager is instructed to commit the first process to the 1PC resource, where the committing the first process to the 1PC resource comprises recording the unique identifier, at step 412.

In various embodiments, once a first notification the first process is committed to the 1PC resource, the global transaction manager may instruct the 2PC resource manager to commit the second process to the 2PC resource. Additionally, the global transaction manager may retain information comprising the 1PC resource manager, the 2PC resource manager, and the unique identifier in a transaction log prior to instructing the 2PC resource manager to commit the first process. The information may be deleted after instructing the 2PC resource manager to commit and receiving a second notification the second process is committed to the 2PC resource and the unique identifier may be deleted from the 1PC resource by the 1PC resource manager.

If the 1PC resource manager fails to commit the first process to the 1PC resource, the global transaction manager may instruct the 2PC resource manager to rollback the second process to the 2PC resource. Instructing the 2PC resource manager to rollback the second process to the 2PC resource may comprise instructing the 2PC resource manager to revert the 2PC resource to an initial state prior to preparing the second process. As previously discussed, information comprising the 1PC resource manager, the 2PC resource manager, and the unique identifier in a transaction log may be retained. The information may be deleted after instructing the 2PC resource manager to rollback the second process. Additionally, the unique identifier may be deleted from the 1PC resource by the 1PC resource manager.

In order to determine whether to rollback or commit the second process using the 2PC resource manager in the event of a system failure (e.g., a crash), the information described above may be retained. The transaction log may be accessed and the global transaction manager may determine if the unique identifier from the transaction log is in the 1PC resource. Based on whether the unique identifier is in the 1PC resource, the global transaction manager may instruct the 2PC resource manager to commit or rollback the second process. The information may be deleted after instructing the 2PC resource manager to commit or rollback and the unique identifier may be deleted from the 1PC resource by the 1PC resource manager.

Figure 5:
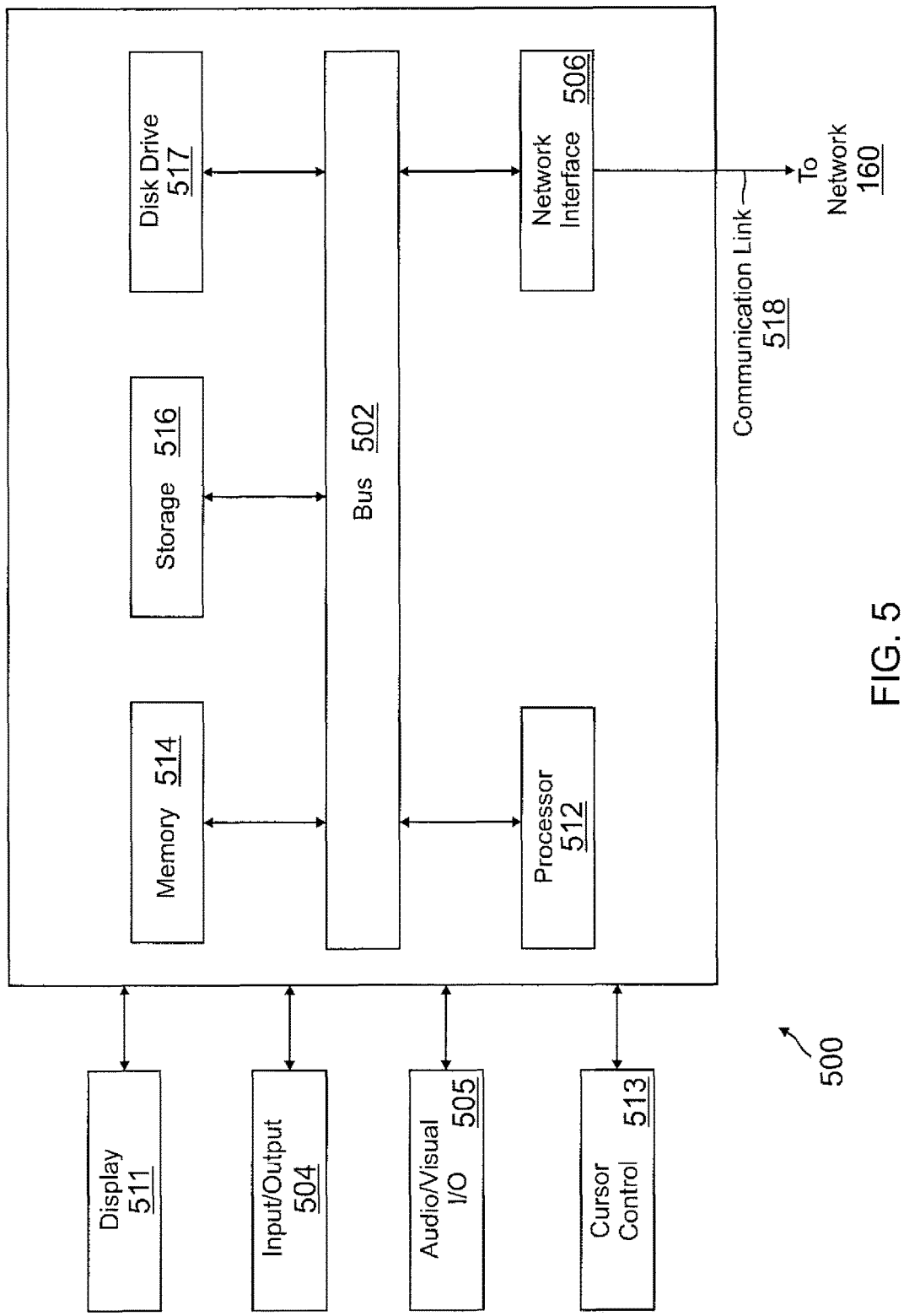
FIG. 5 is a simplified block diagram of a computer system suitable for implementing one or more embodiments of the present disclosure.

FIG. 5 is a block diagram of a computer system 500 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another endpoint, a merchant server, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method for global transaction processing, the method comprising:

accessing, using a global transaction manager, a global transaction having a plurality of processes, wherein the plurality of processes require a single phase commit (1PC) resource and a two phase commit (2PC) resource;

initializing, using one or more hardware processors associated with the global transaction manager, a 1PC resource manager for the 1PC resource that utilizes a single phase commit protocol executed on the 1PC resource to commit a first process of the plurality of processes, wherein the 1PC resource manager utilizes the single phase commit protocol to commit the first process without the global transaction manager or the 1PC resource manager determining that the 1PC resource is at a prepared to commit state prior to committing the first process;

transmitting business logic for the first process of the plurality of processes with a workload for the first process to the 1PC resource manager, wherein the workload of the first process operates on a document of the 1PC resource;

preparing a 2PC resource manager for the 2PC resource and preparing, using the 2PC resource manager, a second process of the plurality of processes, wherein the second process requires the 2PC resource, and wherein the 2PC resource requires a two-phase commit protocol that requires the 2PC resource manager to determine that the 2PC resource is at a prepared to commit state prior to committing the second process to the 2PC resource;

generating a unique identifier for the 1PC resource;

transmitting the unique identifier and a manager identifier for the global transaction manager to the 1PC resource manager with an instruction to record the unique identifier and the manager identifier to the document within stable storage for the 1PC resource during execution of the first process;

retaining information comprising the 1PC resource manager, the 2PC resource manager, and the unique identifier in a transaction log;

instructing the 1PC resource manager to commit the first process to the 1PC resource using the single phase commit protocol, wherein 1PC resource manager commits the first process and records the unique identifier and the manager identifier to the document within the stable storage of the 1PC resource in a single phase commit process without requiring the prepared to commit state of the 1PC resource to record the unique identifier and the manager identifier to the document, wherein the first process records the unique identifier and the manager identifier to the document during a scope of execution of the workload for the first process on the document, wherein the unique identifier persists in the document the stable storage of the 1PC resource after a system failure, and wherein the unique identifier and the manager identifier are not recorded to the 1PC resource if the 1PC resource fails to commit the first process;

detecting the system failure of processing the global transaction;

querying, by a recovery manager based on the workload, the document of the 1PC resource operated on by the workload for the unique identifier and the manager identifier using the transaction log for the global transaction manager to identify the 1PC resource;

determining that the 1PC resource has recovered based on a response from the 1PC resource to the querying the 1PC resource;

determining if the 1PC resource committed the first process from the response and the unique identifier and the manager identifier from the 1PC resource;

accessing the transaction log; and instructing the 2PC resource manager to commit or rollback the second process to the 2PC resource based on the determining if the unique identifier from the transaction log is in the document of the 1PC resource.

2. The method of claim 1, wherein determining if the 1PC resource committed the first process comprises determining that the 1PC resource committed the first process, and wherein in response to determining that the 1PC resource committed the first process, the method further comprises:

receiving a first notification the first process is committed to the 1PC resource; and instructing the 2PC resource manager to commit the second process to the 2PC resource.

3. The method of claim 2, wherein prior to instructing the 1PC resource manager to commit the first process, the method further comprises:

retaining information comprising the 1PC resource manager, the 2PC resource manager, and the unique identifier in the transaction log, and wherein after instructing the 2PC resource manager to commit the second process, the method further comprises:

receiving a second notification the second process is committed to the 2PC resource;

deleting the information from the transaction log after the instructing the 2PC resource manager to commit; and requesting the 1PC resource manager to delete unique identifier from the document of the 1PC resource.

4. The method of claim 1 further comprising:

receiving a notification the first process failed to commit to the 1PC resource; and instructing the 2PC resource manager to rollback the second process to the 2PC resource.

5. The method of claim 4, wherein the instructing the 2PC resource manager to rollback the second process to the 2PC resource comprising instructing the 2PC resource manager to revert the 2PC resource to an initial state prior to preparing the second process.

6. The method of claim 5 further comprising:

retaining information comprising the 1PC resource manager, the 2PC resource manager, and the unique identifier in the transaction log;

deleting the information from the transaction log after the instructing the 2PC resource manager to rollback; and requesting the 1PC resource manager to delete unique identifier from the document of the 1PC resource.

7. The method of claim 1 further comprising:

deleting the information from the transaction log after the instructing the 2PC resource manager to commit or rollback; and requesting the 1PC resource manager to delete unique identifier from the document of the 1PC resource.

8. The method of claim 1, wherein the 1PC resource comprises a non-XA resource, and wherein the 2PC resource comprises an XA resource.

9. The method of claim 1, wherein the 1PC resource comprises one of a Java Database Connectivity (JDBC) compliant resource, a Java Message Service resource, and a NoSQL database resource.

10. A system for global transaction processing, the system comprising:
- at least one hardware processor of a computing device configured to execute a global transaction manager that accesses a global transaction having a plurality of processes, wherein the plurality of processes require a single phase commit (1PC) resource and a two phase commit (2PC) resource, and generates a unique identifier for the 1PC resource;
- a 1PC resource manager that utilizes a single phase commit protocol executed on the 1PC resource to commit a first process of the plurality of processes, coupled to the global transaction manager, that receives, from the global transaction manager, business logic for the first process of the plurality of processes with a workload for the first process, wherein the workload of the first process operates on a document of the 1PC resource, and wherein the 1PC resource manager utilizes the single phase commit protocol to commit the first process without the global transaction manager or the 1PC resource manager determining that the 1PC resource is at a prepared to commit state prior to committing the first process, initializes the first process of the plurality of processes, receives the unique identifier and a manager identifier for the global transaction manager with an instruction to record the unique identifier and the manager identifier to the document within stable storage for the 1PC resource during execution of the first process, and processes the unique identifier and the manager identifier with the first process, wherein the first process requires the 1PC resource;
- a 2PC resource manager, coupled to the global transaction manager, that prepares a second process of the plurality of processes, wherein the second process requires the 2PC resource, and wherein the 2PC resource requires a two-phase commit protocol that requires the 2PC resource manager to determine that the 2PC resource is at a prepared to commit state prior to committing the second process to the 2PC resource,
- wherein the global transaction manager retains information comprising the 1PC resource manager, the 2PC resource manager, and the unique identifier in a transaction log, instructs the 1PC resource manager to commit the first process to the 1PC resource using the single phase commit protocol, wherein the 1PC resource manager commits the first process and records the unique identifier and the manager identifier to the document within the stable storage of the 1PC resource in a single phase commit process without requiring the prepared to commit state of the 1PC resource to record the unique identifier and the manager identifier to the document, wherein the first process records the unique identifier and the manager identifier to the document during a scope of execution of the workload for the first process on the document, wherein the unique identifier persists in the document within the stable storage of the 1PC resource after a system failure, and wherein the unique identifier and the manager identifier are not recorded to the 1PC resource if the 1PC resource fails to commit the first process;
- a recovery manager executed by the global transaction manager that detects the system failure of processing the global transaction, queries, based on the workload, the document of the 1PC resource operated on by the workload using the transaction log for the global transaction manager to identify the 1PC resource, determines that the 1PC resource has recovered based on a response from the 1PC resource to the querying the 1PC resource, determines if the 1PC resource committed the first process from the response and the unique identifier and the manager identifier from the 1PC resource, accesses the transaction log, and instructs the 2PC resource manager to commit or rollback the second process to the 2PC resource based on the determining if the unique identifier from the transaction log is in the document of the 1PC resource.

11. The system of claim 10, wherein the global transaction manager determines that the 1PC resource committed the first process, receives a notification the first process is committed to the 1PC resource, and instructs the 2PC resource manager to commit the second process to the 2PC resource.

12. The system of claim 11, wherein the global transaction manager retains information comprising the 1PC resource manager, the 2PC resource manager, and the unique identifier in the transaction log, and wherein after instructing the 2PC resource manager to commit the second process, the global transaction manager receives a second notification the second process is committed to the 2PC resource, deletes the information from the transaction log after the instructing the 2PC resource manager to commit, and requests the 1PC resource manager to delete unique identifier from the document of the 1PC resource.

13. The system of claim 10, wherein the global transaction manager receives a notification the first process failed to commit to the 1PC resource and instructs the 2PC resource manager to rollback the second process to the 2PC resource.

14. The system of claim 13, wherein the global transaction manager retains information comprising the 1PC resource manager, the 2PC resource manager, and the unique identifier in the transaction log, deletes the information from the transaction log after instructing the 2PC resource manager to rollback, and requests the 1PC resource manager to delete unique identifier from the document of the 1PC resource.

15. The system of claim 10, wherein the 1PC resource comprises a non-XA resource, and wherein the 2PC resource comprises an XA resource.

16. A non-transitory computer readable medium comprising a plurality of machine-readable instructions which when executed by one or more processors of a server are adapted to cause the server to perform a method comprising:
- accessing, using a global transaction manager, a global transaction having a plurality of processes, wherein the plurality of processes require a single phase commit (1PC) resource and a two phase commit (2PC) resource;
- initializing a 1PC resource manager for the 1PC resource that utilizes a single phase commit protocol executed on the 1PC resource to commit a first process of the plurality of processes, wherein the 1PC resource manager utilizes the single phase commit protocol to commit the first process without the global transaction manager or the 1PC resource manager determining that the 1PC resource is at a prepared to commit state prior to committing the first process;
- transmitting business logic for a first process of the plurality of processes with a workload for the first process to the 1PC resource manager, wherein the workload of the first process operates on a document of the 1PC resource;

preparing a 2PC resource manager for the 2PC resource and preparing, using the 2PC resource manager, a second process of the plurality of processes, wherein the second process requires the 2PC resource, and wherein the 2PC resource requires a two-phase commit protocol that requires the 2PC resource manager to determine that the 2PC resource is at a prepared to commit state prior to committing the second process to the 2PC resource;

generating a unique identifier for the 1PC resource;

transmitting the unique identifier and a manager identifier for the global transaction manager to the 1PC resource manager with an instruction to record the unique identifier and the manager identifier to the document within stable storage for the 1PC resource during execution of the first process;

retaining information comprising the 1PC resource manager, the 2PC resource manager, and the unique identifier in a transaction log;

instructing the 1PC resource manager to commit the first process to the 1PC resource using the single phase commit protocol, wherein 1PC resource manager commits the first process and records the unique identifier and the manager identifier to the document within the stable storage of the 1PC resource in a single phase commit process without requiring the prepared to commit state of the 1PC resource to record the unique identifier and the manager identifier to the document, wherein the first process records the unique identifier and the manager identifier to the document during a scope of execution of the workload for the first process on the document, wherein the unique identifier persists in the document within the stable storage of the 1PC resource after a system failure, and wherein the unique identifier and the manager identifier are not recorded to the 1PC resource if the 1PC resource fails to commit the first process;

detecting the system failure of processing the global transaction;

querying, by a recovery manager based on the workload, the document of the 1PC resource operated on by the workload for the unique identifier and the manager identifier using the transaction log for the global transaction manager to identify the 1PC resource;

determining that the 1PC resource has recovered based on a response from the 1PC resource to the querying the 1PC resource;

determining if the 1PC resource committed the first process from the response and the unique identifier and the manager identifier from the 1PC resource;

accessing the transaction log; and instructing the 2PC resource manager to commit or rollback the second process to the 2PC resource based on the determining if the unique identifier from the transaction log is in the document of the 1PC resource.

17. The non-transitory computer readable medium of claim 16, wherein the 1PC resource comprises a non-XA resource, and wherein the 2PC resource comprises an XA resource.

* * * * *